(12) United States Patent
Hood

(10) Patent No.: US 11,018,977 B2
(45) Date of Patent: May 25, 2021

(54) PRE-BUILT MATCH-ACTION TABLES

(71) Applicant: Telefonaktiebolaget L M Ericsson (publ), Stockholm (SE)

(72) Inventor: David Hood, Palo Alto, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 722 days.

(21) Appl. No.: 14/519,007

(22) Filed: Oct. 20, 2014

(65) Prior Publication Data

US 2016/0112317 A1    Apr. 21, 2016

(51) Int. Cl.
| | |
|---|---|
| H04L 12/741 | (2013.01) |
| H04L 12/947 | (2013.01) |
| H04L 12/717 | (2013.01) |
| H04L 12/24 | (2006.01) |
| G06F 9/455 | (2018.01) |

(52) U.S. Cl.
CPC ........ H04L 45/745 (2013.01); H04L 41/0893 (2013.01); H04L 45/42 (2013.01); H04L 49/25 (2013.01); *G06F 2009/45595* (2013.01); *H04L 41/5096* (2013.01)

(58) Field of Classification Search
CPC .............................. H04L 12/2613; H04L 41/44
See application file for complete search history.

(56) References Cited

U.S. PATENT DOCUMENTS 8,830,835 B2 * 9/2014 Casado ................... H04L 12/66
370/235

2013/0044764 A1    2/2013 Casado et al.
2013/0058350 A1 *  3/2013 Fulton ................ H04L 41/0896
370/400

OTHER PUBLICATIONS

Ali, Z., et al., "Node-IDS Based Resource Reservation Protocol (RSVP) Hello: A Clarification Statement", *Network Working Group; RFC 4558*; Jun. 2006. 7 pages.

Andersson, L., et al., "LDP Specification", *Network Working Group; RFC 5036*; Oct. 2007; 135 pages.

Awduche, D., et al., ""RSVP-TE: Extensions to RSVP for LSP Tunnels,"", *Network Working Group; RFC 3209*; Dec. 2001; 61 pages.

Babiarz, J., et al., "Configuration Guidelines for DiffServ Service Classes", *Network Working Group; RFC 4594*; Aug. 2006; 57 pages.

(Continued)

*Primary Examiner* — Elton Williams
(74) *Attorney, Agent, or Firm* — Sage Patent Group

(57) ABSTRACT

A method is implemented by a processor of a computing device for generating an output match action table (MAT) or output MAT template from an input MAT template. The input MAT template is transformed through successive updates of symbolic actions using policy rules into the output MAT or output MAT template. The method includes selecting a first MAT row from the input MAT template and selecting a first action field from the first MAT row. A check is made whether the first action field includes a first symbolic action. The first symbolic action is looked up to determine whether a first policy rule has been defined for the first symbolic action. A first action specified by the first policy rule is written into a corresponding action field of a corresponding MAT row in the output MAT template or the output MAT to replace the first symbolic action.

23 Claims, 8 Drawing Sheets

(56) References Cited

OTHER PUBLICATIONS

Baker, F., et al., "A Differentiated Services Code Point (DSCP) for Capacity-Admitted Traffic", *Internet Engineering Task Force (IETF)*; RFC 5865; May 2010; 14 pages.

Baker, F., et al., "Management Information Base for the Differentiated Services Architecture", *Network Working Group; RFC 3289*; May 2002; 107 pages.

Berger, L., "Generalized Multi-Protocol Label Switching (GMPLS) Signaling Resource ReserVation Protocol-Traffic Engineering (RSVP-TE)", *Network Working Group; RFC 3473*; Jan. 2003; 42 pages.

Bernet, Y., et al., "An Informal Management Model for Diffserv Routers", *Network Working Group; RFC 3290*; May 2002; 56 pages.

Black, D., "Differentiated Services and Tunnels", *Network Working Group; RFC 2983*; Oct. 2000; 14 pages.

Black, D., et al., "Per Hop Behavior Identification Codes", *Network Working Group*, Jun. 2001, Standards Track, RFC 3140, pp. 1-8.

Blake, S., et al., "An Architecture for Differentiated Services", *Network Working Group; RFC 2475*; Dec. 1998; 36 pages.

Borman, D., et al., "IPv6 Jumbograms", *Network Working Group; RFC 2675*; Aug. 1999; 9 pages, Copyright the Internet Society 1999.

Braden, R., et al., ""Resource ReSerVation Protocol (RSVP)—Version 1 Functional Specification,"", *Network Working Group, RFC 2205*; Sep. 2007; 112 pages.

Chan, K., et al., "Differentiated Services Quality of Service Policy Information Base", *Network Working Group; RFC 3317*; Mar. 2003; 96 pages.

Charny, A., et al., "Supplemental Information for the New Definition of the EF PHB (Expedited Forwarding Per-Hop Behavior)", *Network Working Group; RFC 3247*; Mar. 2002; 24 pages.

Coltun, R., et al., "OSPF for IPv6", *Network Working Group; RFC 5340*; Jul. 2008; 60 pages.

Davie, B., et al., "An Expedited Forwarding PHB (Per-Hop Behavior)", *The Internet Society*, Mar. 2002, RFC 3246, pp. 1-15.

Deering, et al., "Internet Protocol", *IETF RFC 2460, version 6 (IPv6) Specification*, Dec. 1998, 37 pages, http://www.ietf.org/rfc/rfc2460.txt.

Eggert, L., et al., "Unicast UDP Usage guidelines for Application Designers", *Network Working Group; RFC 5405*; Nov. 2008; 27 pages.

Fenner, B., et al., "Management Information Base for the User Datagram Protocol (UDP)", *Network Working Group; RFC 4113*; Jun. 2005; 19 pages.

Grossman, D., "New Terminology and Clarifications for Diffserv", *Network Working Group; RFC 3260*; Apr. 2002; 10 pages.

Hedrick, C., "Routing Information Protocol", *Network Working Group; RFC 1058*; Jun. 1988; 33 pages.

Heinanen, J., et al., "Assured Forwarding PHB Group", *The Internet Society, RFC 2597*, (Jun. 1999), 11 pages.

Housley, R., et al., "Using Advanced Encryption Standard (AES) CCM Mode with IPsec Encapsulating Security Payload (ESP)", *Network Working Group; RFC 4309*; Dec. 2005; 13 pages.

Kent, S., et al., "Security Architecture for the Internet Protocol", *Network Working Group; RFC 4301*; Dec. 2005; 101 pages.

Kompella, K., et al., "Procedures for Modifying the Resource reSerVation Protocol (RSVP)", *Network Working Group; RFC 3936*; Oct. 2004; 7 pages.

Malkin, G., et al., "RIP Version 2", *Network Working Group; RFC 2453*; Nov. 1998; 39 pages.

Malkin, G., et al., "RIPng for IPv6", *Network Working Group; RFC 2080*; Jan. 1997; 19 pages.

Moy, J, "OSPF Version 2", *RFC 2328, Network Working Group*, Apr. 1998, 204 pages.

Nichols, K., et al., "Definition of Differentiated Services Per Domain Behaviors and Rules for their Specification", *Network Working Group; RFC 3086*; Apr. 2001; 24 pages.

Nichols, K., et al., "Definition of the Differentiated Services Field (DS Field) in the IPvd and IPv6 Headers", *The Internet Society*, Dec. 1998, RFC 2474, pp. 1-19.

Oran, D., "RFC 1142 OSI IS-IS Intra-Domain Routing Protocol", *Digital Equipment Corp.* Feb. 1990, http://www.faqs.org/rfcs/rfc1142.html., Oct. 19, 2011.

Polk, J., et al., "A Resource Reservation Protocol (RSVP) Extension for the Reduction of Bandwidth of a Reservation Flow", *Network Working Group; RFC 4495*; May 2006; 21 pages.

Postel, J., ""User Datagram Protocol",", Aug. 28, 1980, 3 pages, RFC 768.

Postel, J., "Transmission Control Protocol", *STD 7, RFC 793, Internet Standard*, Information Sciences Institute, USC, 4676 Admiralty Wy, Marina del Rey, CA 90291., (Sep. 1981), 91 pages.

Rekhter, Y., et al., ""A Border Gateway Protocol 4 (BGP-4)",", *RFC 4271*, Jan. 2006.

Rosen, et al., *Network Working Group; RFC 4364*; ;BGP/MPLS IP Virtual Private Networks (VPNs), copyright the Internet Society (2006); Feb. 2006; 47pgs.

Shenker, S., et al., "Specification of Guaranteed Quality of Services", *Network Working Group; RFC 2212*; Sep. 1997; 20 pages.

Socolofsky, T., et al., "A TCP/IP Tutorial", *Network Working Group; RFC 1180*; Jan. 1991; 28 pages.

Wroclawski, J., "Specification of the Controlled-Load Network Element Service", *Network Working Group; RFC 2211*; Sep. 1997; 19 pages.

Wroclawski, J., "The Use of RSVP with IETF Integrated Services", *Network Working Group; RFC 2210*; Sep. 1997; 33 pages.

Bosshart, et al., "Forwarding Metamorphosis: Fast Programmable Match-Action Processing in Hardware for SDN," ACM, SIGCOMM'13, Aug. 12-16, 2013, 12 pages.

IEEE 802-2014: "Overview and Architecture," IEEE Standard for Local and Metropolitan Area Networks, The Institute of Electrical and Electronics Engineers, Inc. (IEEE), Jun. 30, 2014, 74 pages.

Open Networking Foundation, "OF-PI: A Protocol Independent Layer," version 1.1, ONF TR-505, Sep. 5, 2014, 23 pages.

Open Networking Foundation, "OpenFlow Switch Specification," version 1.3.3 (protocol version 0x04), ONF TS-015, Sep. 27, 2013, 165 pages.

Schlesinger, et al., "Concurrent NetCore: From Policies to Pipelines," ACM, ICFP '14, Sep. 1-6, 2014, 14 pages.

Anonymous, "Control table—Wikipedia," Feb. 20, 2014, retrieved from the Internet: https://en.wikipedia.org/w/index.php?title=Control table&oldid=596282221 on Jul. 10, 2019, 18 pages.

* cited by examiner

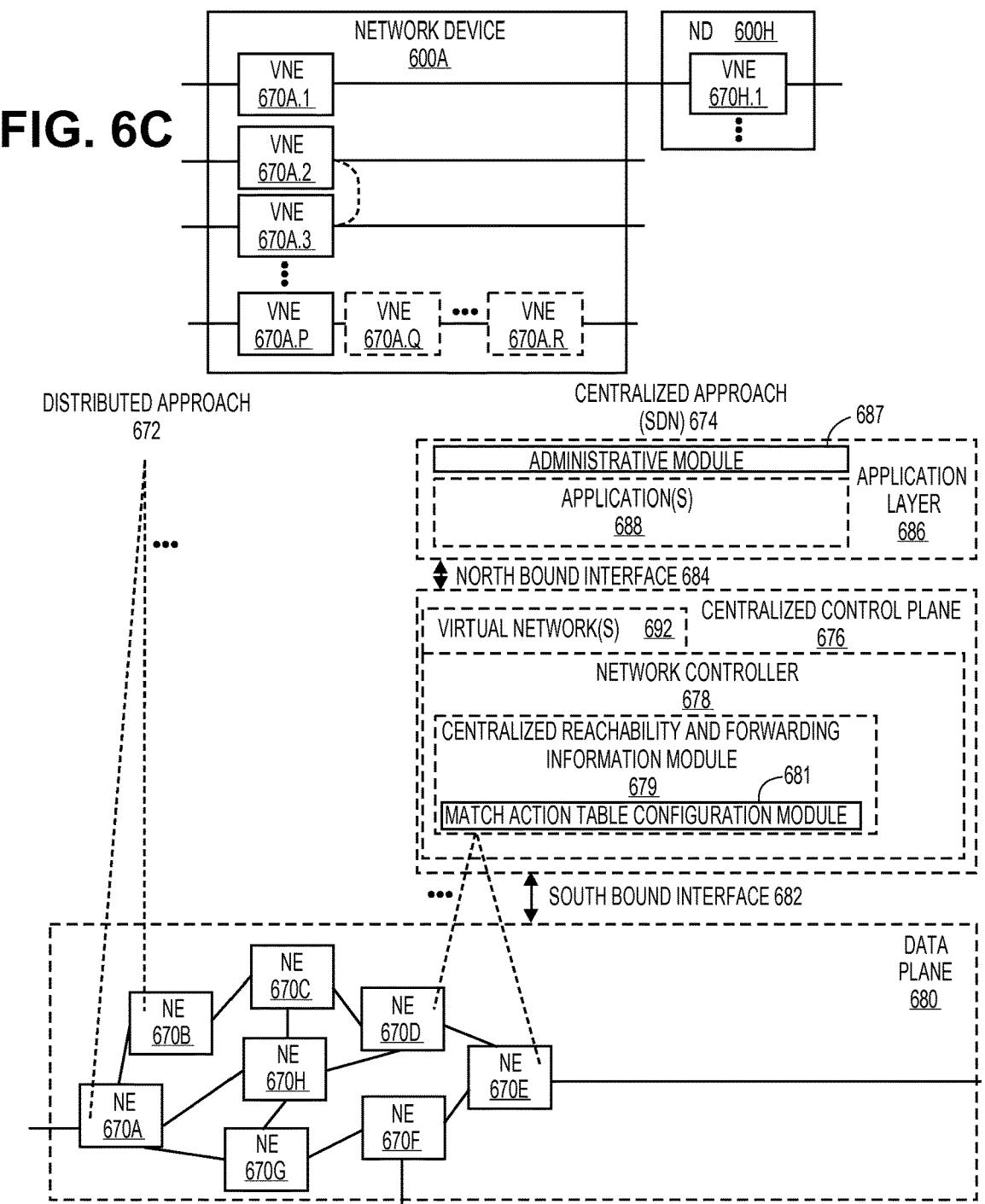
FIG. 6C
FIG. 6D
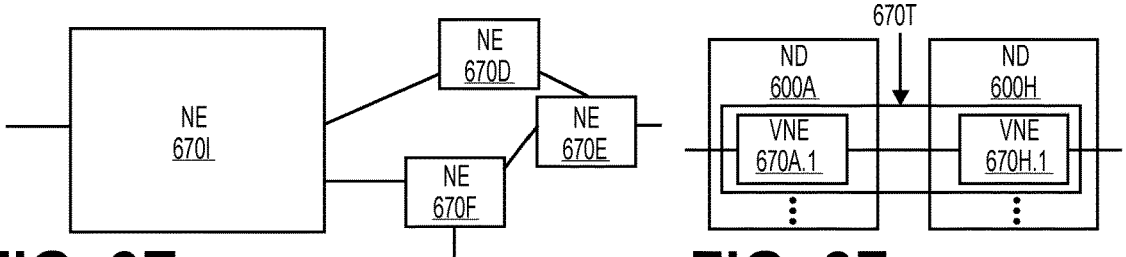
FIG. 6E
FIG. 6F

PRE-BUILT MATCH-ACTION TABLES

FIELD

Embodiments of the invention relate to creation of match action tables for data packet forwarding. Specifically, the embodiments relate to a system and process for an automated and iterative process for refining match action tables from general to network device specific implementations.

BACKGROUND

The concept and use of match action tables (MATs) is common in network devices (NDs) that forward or process data packet traffic. According to this model, fields in the data packet header of arriving traffic are matched against match action table rows (also referred to as match action table entries). Information in addition to the packet header can also be used as a match criterion. For example, Ethernet flows with identical virtual local area network identifiers (VLAN IDs) may appear on distinct logical ports, whereupon the logical port identity (which is not contained in the packet header) becomes a criterion to distinguish the packet data flows. When a match is found, the corresponding match action table row contains one or more action fields that specify the disposition of the packet. A disposition of a packet may include packet discard, forwarding the packet to the switch controller for software analysis, or modifying the packet header in a number of possible ways, then forwarding the packet to one or more output ports of the network device.

Match action table rows are typically prioritized, with the first match in priority order determining the action. This facilitates longest-prefix match semantics in recognizing Internet Protocol (IP) addresses, but it also allows for a lowest priority table entry to match anything that has not been provisioned into the table. This lowest priority entry is often referred to as a table miss entry, and frequently results in the miss packet being forwarded to the switch controller. After analysis, the controller may create a table entry designed to match the miss packet header, so that subsequent similar packets are treated according to the controller's decision.

Packets received at the network device can be nested, such that higher-level protocol data units (PDUs) are encapsulated in lower-level transport PDUs, which may in turn be further encapsulated in even lower-level PDUs. Encapsulation may occur in the same protocol, for example double-tagged Ethernet frames or stacked multi-protocol label switching (MPLS) labels, or may serve as the boundary between protocols, for example transmission control protocol (TCP) in IP in Ethernet. An outer protocol typically contains a field that identifies the next protocol header; for example, an EtherType field in Ethernet packets, or a next header field in IP version 6 (IPv6) packets.

Frequently, an outer header needs to be parsed, with traffic broken into streams based on the outer header fields, following which, each data stream is further parsed on the basis of an inner header. Actual implementations vary, but the model for this process is a tree: an outer header MAT followed by a set of inner header MATs in parallel, each inner header MAT being tailored to the appropriate EtherType or next header encapsulation, and continuing through as many headers as may be of interest to the functions of the particular network device. The branches of a tree need not all be the same length. For example, Ethernet traffic may comprise intermixed packets, some of which have no VLAN tags, others of which are single-tagged, others still being double-tagged, all carrying IP packets, with yet other Ethernet packets whose EtherType (e.g., address resolution protocol (ARP)) directs the packets to the controller.

Particular protocols often have constraints on the meanings of particular header values or ranges of values. By way of example, 48-bit Ethernet media access control (MAC) addresses are partitioned by standards (IEEE 802 in this case) into globally unique or locally administered subsets, further into unicast or multicast subsets, a single broadcast address (which is valid only as a destination address), and a range of destination addresses referred to as bridge-filtered, this latter range never forwarded by a network device such as a bridge, but always deflected to local control for processing.

One of the principles of software defined networking (SDN) is the decoupling of control and forwarding planes, which is intended to facilitate competition between switch vendors by standardizing their forwarding control interfaces. To this end, organizations such as Open Networking Foundation (ONF), and protocols such as OpenFlow (OF) have developed open models of network devices (e.g., switches), based around the match-action table concept.

SUMMARY

A method is implemented by a processor of a computing device for generating an output match action table or output match action table template from an input match action table template. The input match action table template is transformed through successive updates of symbolic actions using policy rules into the output match action table or output match action table template. The method includes selecting a first match action table row from the input match action table template and selecting a first action field from the first match action table row. A check is made whether the first action field includes a first symbolic action. The first symbolic action is looked up to determine whether a first policy rule has been defined for the first symbolic action. A first action is written into a corresponding action field of a corresponding match action table row in the output match action table template or the output match action table to replace the first symbolic action where the first action is specified by the first policy rule.

In another embodiment, a network device implements a method for generating an output match action table from an input match action table template. The input match action table template is transformed through successive updates of symbolic actions using policy rules into the output match action table. The network device includes a non-transitory computer-readable medium having stored therein a match action table configuration module and a forwarding engine. The network device also includes a network processor coupled to the non-transitory computer-readable medium. The network processor is configured to execute the match action table configuration module and the forwarding engine. The match action table configuration module is configured to select a first match action table row from the input match action table template, to select a first action field from the first match action table row, and to check whether the first action field includes a first symbolic action. The match action table configuration module is further configured to look up the first symbolic action to determine whether a first policy rule has been defined for the first symbolic action, and to write a first action into a corresponding action field of a corresponding match action table row in the output match action table to replace the first symbolic action where the first action is specified by the first policy rule. The forwarding engine is configured to forward protocol data units based on the output match action table generated from the input match action template.

In another embodiment, a computing device implements a plurality of virtual machines for implementing network function virtualization (NFV), wherein a virtual machine from the plurality of virtual machines is configured to execute a method for generating an output match action table or output match action table template from an input match action table template. The input match action table template is transformed through successive updates of symbolic actions using policy rules into the output match action table or output match action table template. The computing device includes a non-transitory computer-readable medium having stored therein a match action table configuration module and a processor coupled to the non-transitory computer-readable medium. The processor is configured to execute the virtual machine that implements the match action table configuration module. The match action table configuration module is configured to select a first match action table row from the input match action table template, to select a first action field from the first match action table row, and to check whether the first action field includes a first symbolic action. The match action table configuration module is further configured to look up the first symbolic action to determine whether a first policy rule has been defined for the first symbolic action and to write a first action into a corresponding action field of a corresponding match action table row in the output match action table or output match action table template to replace the first symbolic action where the first action is specified by the first policy rule.

In another embodiment, a control plane device is configured to implement at least one centralized control plane for a software defined network (SDN). The centralized control plane is configured to execute a method for generating an output match action table or output match action table template from an input match action table template. The input match action table template is transformed through successive updates of symbolic actions using policy rules into the output match action table or output match action table template. The control plane device includes a non-transitory computer-readable medium having stored therein a match action table configuration module and a processor coupled to the non-transitory computer-readable medium. The processor is configured to execute the match action table configuration module. The match action table configuration module is configured to select a first match action table row from the input match action table template, and to select a first action field from the first match action table row, to check whether the first action field includes a first symbolic action. The match action table configuration module is further configured to look up the first symbolic action to determine whether a first policy rule has been defined for the first symbolic action, and to write a first action into a corresponding action field of a corresponding match action table row in the output match action table or output match action table template to replace the first symbolic action where the first action is specified by the first policy rule.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments of the invention.

FIG. 6D illustrates a network with a single network element (NE) on each of the NDs of FIG. 6A.

FIG. 6E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.

FIG. 6F illustrates a case where multiple VNEs are implemented on different NDs and are coupled to each other, and where the centralized control plane has abstracted these multiple VNEs such that they appear as a single VNE within one of the virtual networks of FIG. 6D, according to some embodiments of the invention.

DETAILED DESCRIPTION

Figure 1:
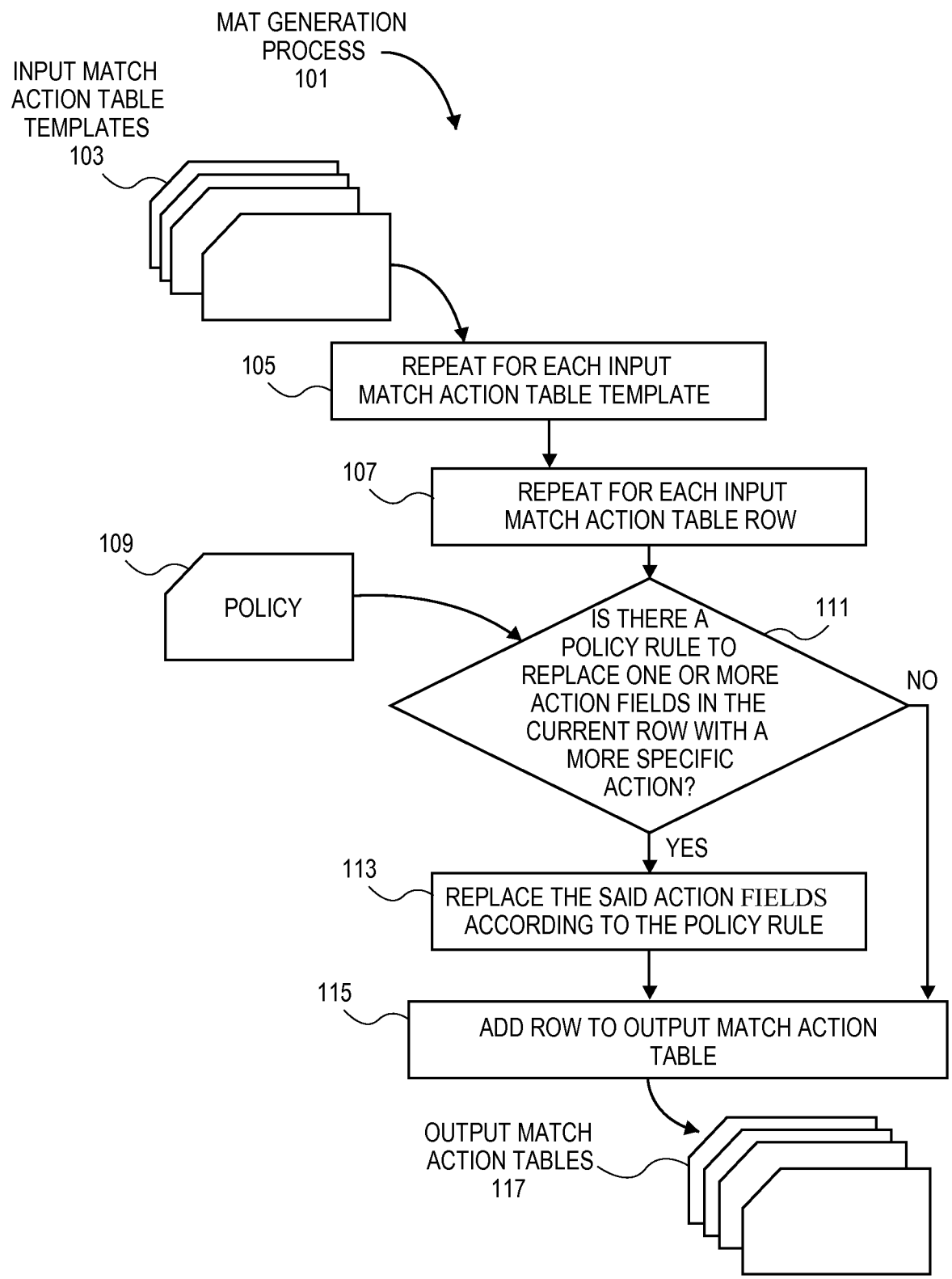
FIG. 1 is a diagram of one embodiment of an example process for iteratively refining match action tables from templates using policy based rules.

The following description describes methods and apparatus for generating match action tables using an iterative process to ensure that accurate and complete match action tables are generated for a given packet processing protocol. The method and apparatus refine symbolic representation of actions in the action fields of the match action table rows through successive iterations using policy-based rules References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

Network devices (NDs) that utilize match action tables for handling the forwarding of protocol data units (PDUs also referred to as packets) must be configured with all of the specialized match action table rows, which include matching criteria and actions, for every data processing and networking protocol that the network device is designed to process. Given that these data processing and networking protocols are all defined in standards, it is inefficient to comb through the standards and encode the matching criteria and corresponding actions in a form or implementation that is specific to each network device.

The embodiments of the invention facilitate complete and correct coverage of match action tables by starting with a set of match action table templates, the set comprising for example a separate match action table template for each protocol of interest. By constructing the original match action table template(s) to include all of the special field values and ranges, designers are assisted in focusing and making decisions on each case, thereby reducing the chance of oversight and unintended behavior in what is often a repetitive and uninteresting, but important, aspect of generating match action tables for the network devices being developed.

The completely generic match action table template used at the beginning of the process comprises a set of match action table rows, each row containing match criteria that identify specialized field values or ranges. If desired, the designer may modify the match action table template, for example to install table rows that further specify field values or ranges for the designer's particular purpose.

As well as a match criterion, each match action table row in a match action table template also contains one or more action fields, which contain actions that specify the treatment to be accorded a matching packet. However, it is not expected that the intended actions would be the same for every target application of the ultimate match action table, nor that identical intended actions, for example packet discard, would be represented in the same executable form on all target network devices.

Accordingly, the embodiments of the present invention provide for successive stages of refinement, whereby symbolic actions in an input match action table template may be replaced by more specific symbolic actions, or by executable forms of the intended action. The replacement of a more abstract symbolic action by a more specific action is directed by the rules of a policy, which ensures uniform treatment of templates across development environments and across time.

Each iteration of this refinement process yields an output match action table template or match action table, which may become the input match action table template to a further iteration of the same process, but guided by a less abstract policy, until ultimately all symbolic actions are resolved into forms that are executable by the intended target network device. As used herein, the term match action table template refers to table structure similar to a match action table, except that the match action table template includes a set of match action table rows where at least one of the match action table rows contains at least one symbolic action to be resolved, whereas a match action table refers to a table structure with a set of match action table rows where all of the match action table rows contain only executable actions.

Although the list of matching criteria and the associated actions is well-defined, different network devices, which have different architectures and resources, have different action models for the handling of PDUs that match a given set of criteria related to a data processing or networking protocol. Further, different deployment environments may require different treatment of packets. As such, the actions corresponding to the standard set of matching criteria require flexibility.

The embodiments provide a method and system for ensuring accurate and complete implementation of data processing and networking protocols that iteratively refine a starting set of match action table templates into a set of match action tables that implement the data processing and networking protocols in a manner that is specific to the executing device. A family of match action tables is proposed to be automatically generated (i.e., one match action table for each protocol or sub-protocol, according to pragmatic partitioning criteria), with the corresponding action represented symbolically, such that resolution of each symbol suffices to define the specific action desired for PDUs with the matching packet header.

The match action tables that are generated using this process are to be available at any stage of the life cycle. At design time, the match action table templates are available for inclusion into software executable or data modules. Resolution of symbolic actions to executable actions may be performed during the construction or building of software distributions. At factory programming time, the match action table templates can be installed into network device memory devices, such that the network devices ship with the basic match action tables already available. Resolution of symbolic actions to executable actions may also be performed during the factory load, or may be left for subsequent resolution according to specific policies defined by customers, software vendors, system integrators or combinations thereof.

At network device initialization time, the match action table templates can be available as components that can be downloaded into network devices. Resolution of symbolic actions to executable actions would be performed by either the network device, or by the controller (e.g., in a software define network), according to specific policies defined by software. Thus, complete resolution (i.e., resolving symbolic actions to executable actions) or partial resolution (i.e., resolving symbolic actions to more specific symbolic actions) of all symbolic actions or a subset of symbolic actions may be performed at one or more stages of the life cycle.

The embodiments provide advantages over the prior art. The embodiments avoid the unproductive and error-prone task of developing standard match criteria and actions for match action table rows for every network device that is developed, both within a company and across the industry, coding them, testing them and distributing them. However, the embodiments retain the flexibility of assigning any desired action to protocol data units that satisfy match criteria.

FIG. 1 is a diagram of one embodiment of an example process 101 for iteratively refining match action tables from templates using policy based rules. The process illustrated is an overview of the overall refinement process starting with a set of input match action table templates 103. The input match action table templates 103 can be constructed on a per data processing or network protocol basis, with a separate template created for each process or protocol to be implemented by an end network device. The input match action table templates 103 have a general structure of a match action table including a set of match action table rows. A 'set,' as used herein refers to any whole number of items including one item. Each match action table row includes a matching criteria field and at least one action field. The matching criteria field identifies the protocol data unit (PDU) header information and possibly metadata information that are to be matched by the network device executing the match action table. The action fields define an action to be carried out for the PDU with the matching criteria; this can include discarding the PDU, modifying any part of the PDU, instructions for how to forward the PDU or similar actions.

Each of the input match action table templates 103 is processed either serially or in parallel with one another (Block 105), such that each row of each input match action table template is processed (Block 107). For each row of each match action table template, a check is made whether there exists a policy 109 that defines a set of rules that are specific to a match action table template, where the set of rules may define conditions under which one or more action fields in the selected match action table rows may be updated with more specific actions (Block 111). In some embodiments, as discussed further herein below, action fields in each match action table row can include symbols or 'symbolic actions' that are abstractions or references to be resolved by applicable policies 109. The policies define a set of conditions such as network device configuration or architecture, network architecture, network topology and similar conditions and a set of corresponding actions for replacing given symbolic actions in the match action table templates. As used herein, a match action table template refers to the initial input match action table templates as well as intermediate match action table templates where the initial template has been modified or updated to replace any subset of the symbols or symbolic actions in the action fields with either more specific symbolic actions or with executable actions until a complete match action table is derived containing only match action table rows with action fields containing executable actions. An executable action as used herein refers to an action that can be implemented by a forwarding engine of a network device to handle a matching PDU.

If there exists a policy 109 that defines a set of rules that are specific to a match action table template, the applicable one or more action fields are replaced with one or more specific actions according to the policy rule(s) (Block 113). If no applicable policy rules are found, then the process 101 continues by writing the match action table row being processed to an output match action table (Block 115). As discussed further herein below, the process can iterate through successive policy sets to refine (i.e., progressively update toward an executable status) the match action table template into a match action table to be utilized by a forwarding engine of a network device. Application of different policies is discussed in relation to FIG. 2.

Figure 2:
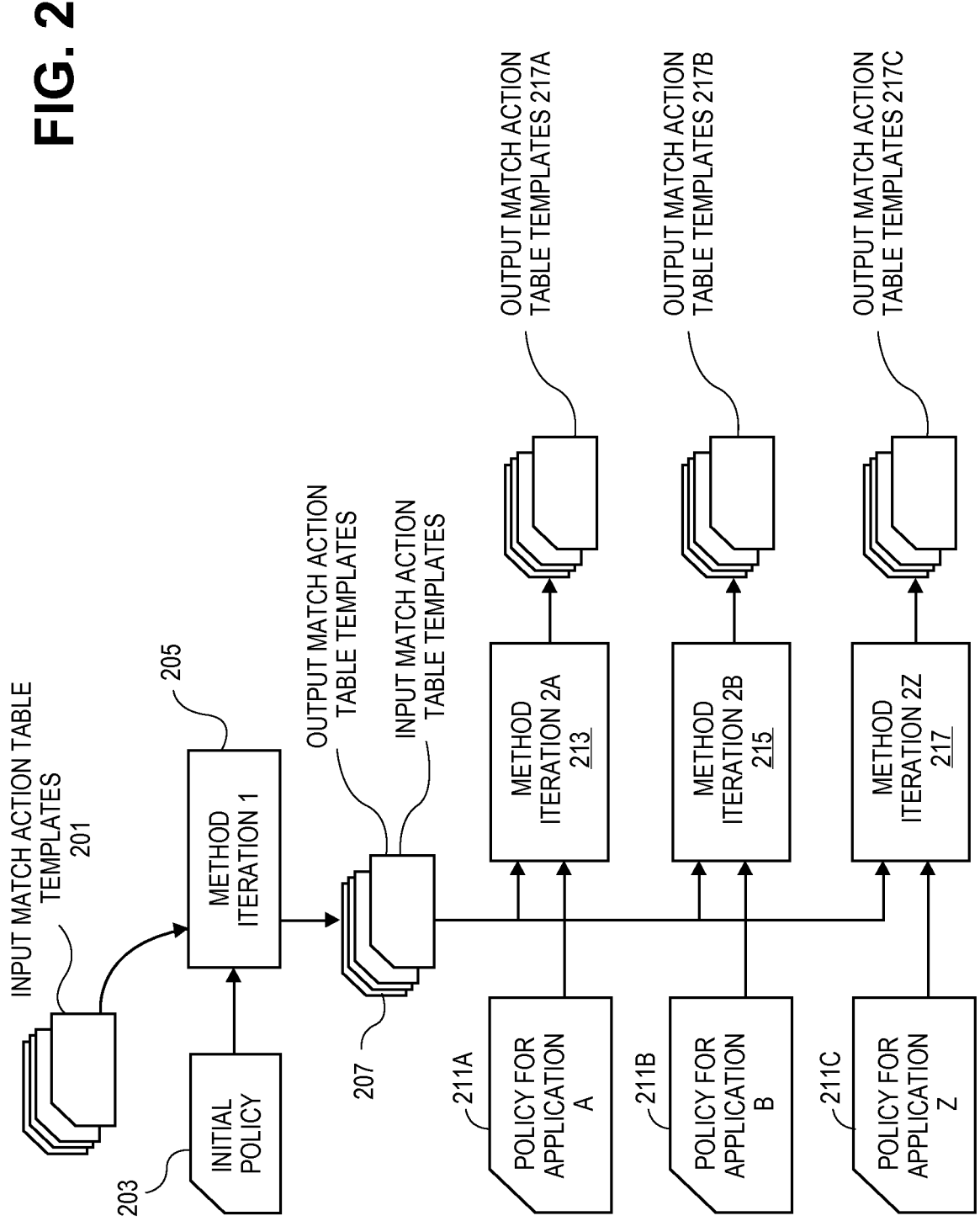
FIG. 2 is a diagram of one embodiment of an example iterative hierarchical tree.

FIG. 2 is a diagram of one embodiment of an example iterative hierarchical tree for generating varying match action tables given an initial set of match action table templates. In this example, the application of varying policies is demonstrated over differing iterations. The process begins with a set of match action table templates 201. These match action table templates are then processed through a first iteration (Block 205) of the overall match action table generation and refinement process. The first iteration applies a first set of policies 203 and produces a set of output match action table templates 207, which are not completely executable match action tables. These output match action table templates 207 serve as input templates to a set of additional possible iterations 213-217, which each have corresponding sets of policies 211A-C for differing conditions or applications. Differing applications can be different types of architectures for a destination network device, differing network topologies or similar differences in application of the match action tables. The process can create multiple sets of output match action tables 217A-C for each of the corresponding applications in parallel, serial, on an as needed basis or via a similar process. The details of one embodiment of a given method of a single iteration are described herein below with regard to FIG. 3.

Figure 3:
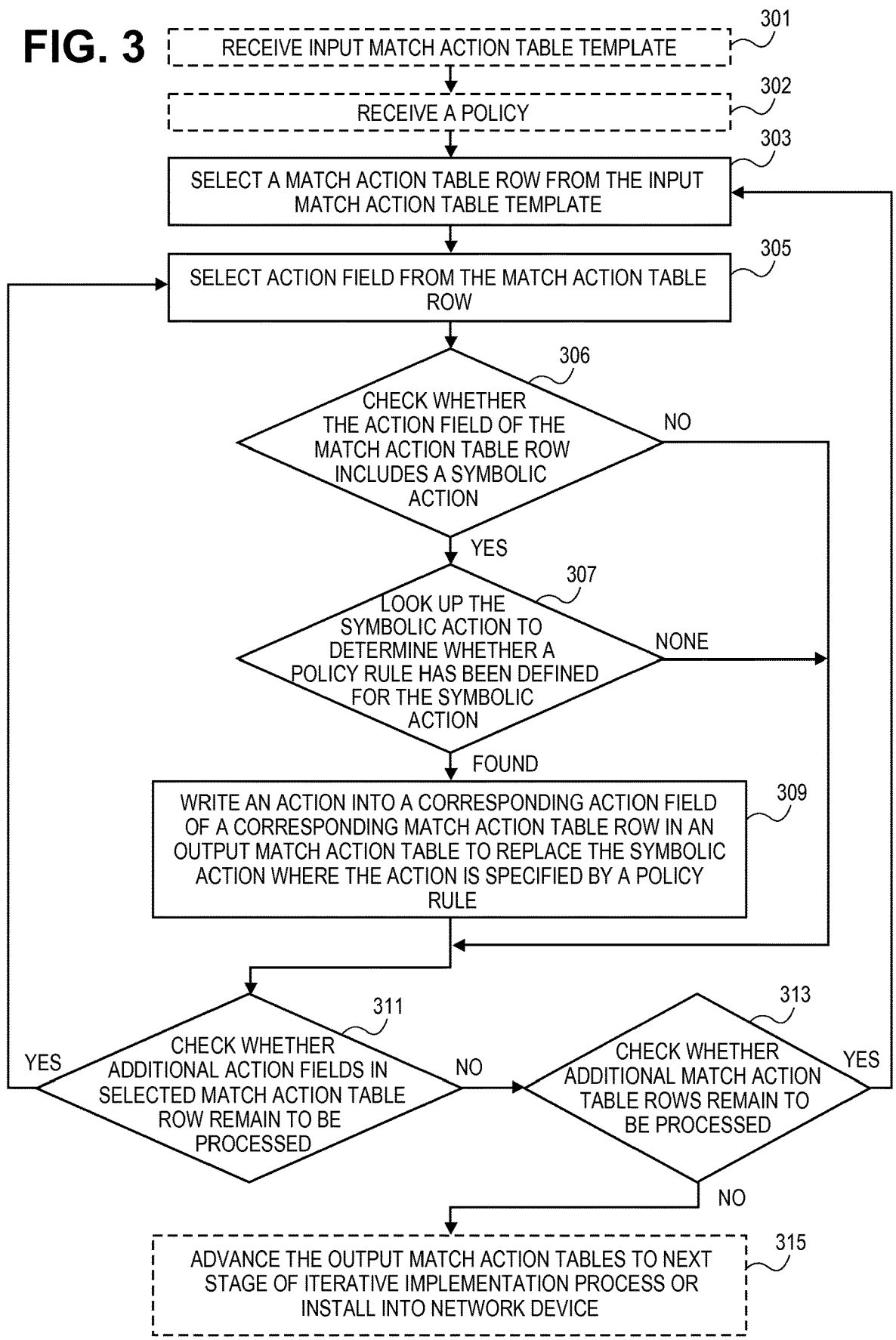
FIG. 3 is a flowchart of one embodiment of a process for iteratively generating match action tables using policy based rules.

FIG. 3 is a flowchart of one embodiment of a process for iteratively generating match action tables using policy based rules. This process, referred to herein as a match action table template symbolic action update process, describes a single iteration in an overall iterative process for successively refining a match action table template into a match action table. One skilled in the art would understand that this process can be applied in each iterative stage of the overall process described herein above to further refine a match action table template with each successive stage of the iterative process. This particular iterative stage can itself be an iterative process over the action fields of each of the rows of a given match action table template.

This symbolic action update process begins with the receipt of an input match action table template (Block 301) and receipt of a policy (Block 302). In some embodiments, a copy of the input match action table template is made as a starting point for an output match action table or an output match action table template, while in other embodiments the output match action table or an output match action table template can be generated by copying each match action table row as it is processed. Any variant of an initial copy of the match action table template and subsequent modification thereof or an iterative construction of the output match action table template is compatible with this process. This symbolic action update process can be applied to multiple input match action table templates (not shown in FIG. 3) in parallel, serially or in any order. The symbolic action update process is described as an iterative process over the rows and action fields by way of example and not limitation. One skilled in the art would understand that alternative implementations of such a recursive or similar alternatives are also applicable. The symbolic action update process selects a match action table row from the input match action table template (Block 303). From the selected row, the symbolic action update process selects an action field (Block 305).

A check is made of the selected action field to determine whether the action field includes a symbolic action that can be resolved with any of the rules in the received policy (Block 306, 307). If there is no matching symbolic action then no further processing of this action field is required and the process checks whether additional action fields in the selected match action table row remain to be processed (Block 311). If additional action fields in the selected match action table row remain to be processed then the next action field is selected (Block 305). If no additional action fields in the selected match action table row remain to be processed then a check whether additional match action table rows remain to be processed is made (Block 313). If the additional match action table rows remain to be processed, then the next match action table row is selected (Block 303). When all action fields of all match action table rows have been processed then the resulting output match action table or output match action table template can be returned to the overall refinement process, which may result in a further refinement iteration with additional policies (i.e., for an output match action table template) or the installing of a completed match action table onto the forwarding engine of a network device. In embodiments where the match action table template or the match action table is not initially copied, as each unchanged match action table row is checked for symbolic actions and no actions are found, the unchanged match action table row can be written to the output match action table or output match action table template. In the embodiments where there is an initial copy or similar initialization then this row by row copying is not necessary and only the modified match action table rows or specific action fields need to be modified.

Where a symbolic action was found in an action field (Block 306), then a check is made whether there is a matching policy rule that applies to the symbolic action (Block 307). If there is no matching policy rule, then the symbolic action update process continues on to other action fields, continues on to other match action table rows, or completes as described above with regard to not finding a symbolic action in an action field (Block 306). If however, an applicable policy is found, then an action is written into a corresponding action field of a corresponding match action table row in an output match action table or output match action table template (Block 309). As mentioned above, this can be a write to a pre-existing copy of the input match action table template or can be an iterative construction of the output match action table or output match action table template. The written action can be an executable action or a refining symbolic action. A refining symbolic action is closer to an executable action in an overall hierarchy of policies and iterations in the refinement process. By way of example, it may be known at an intermediate stage of refinement that a given matched packet should be forwarded to the switch controller (i.e., a controller in a software defined network (SDN)) for further processing, so the replacement symbolic action might be "controller." Different network devices, however, would have different ways to express this intention in executable form, so the "controller" symbol would be further resolved into executable form at some subsequent stage of refinement, in this case when the target network device type was selected, possibly according to one branch of the iteration illustrated in FIG. 2.

After a match action table row or action field is updated (or created), the process can check whether additional action fields or match action table rows remain to be processed (Blocks 311 and 313). If additional action fields or match action table rows remain, then the process continues on to select the next action field and/or match action table row (Blocks 303 and 305). Once all action fields and match action table rows have been processed, then the process, in some embodiments, completes by writing the processed table rows, as modified, to an output match action table or match action table template, thereby advancing the resulting match action table template to the next iteration of the overall refinement process or by installing the match action table to be utilized by the forwarding engine of a network device. In other embodiments, the modification or construction of the output match action table or output match action table template does not require a write of the table rows after the completion process, because it has progressively updated or generated the match action table rows as they are processed.

Figure 4:
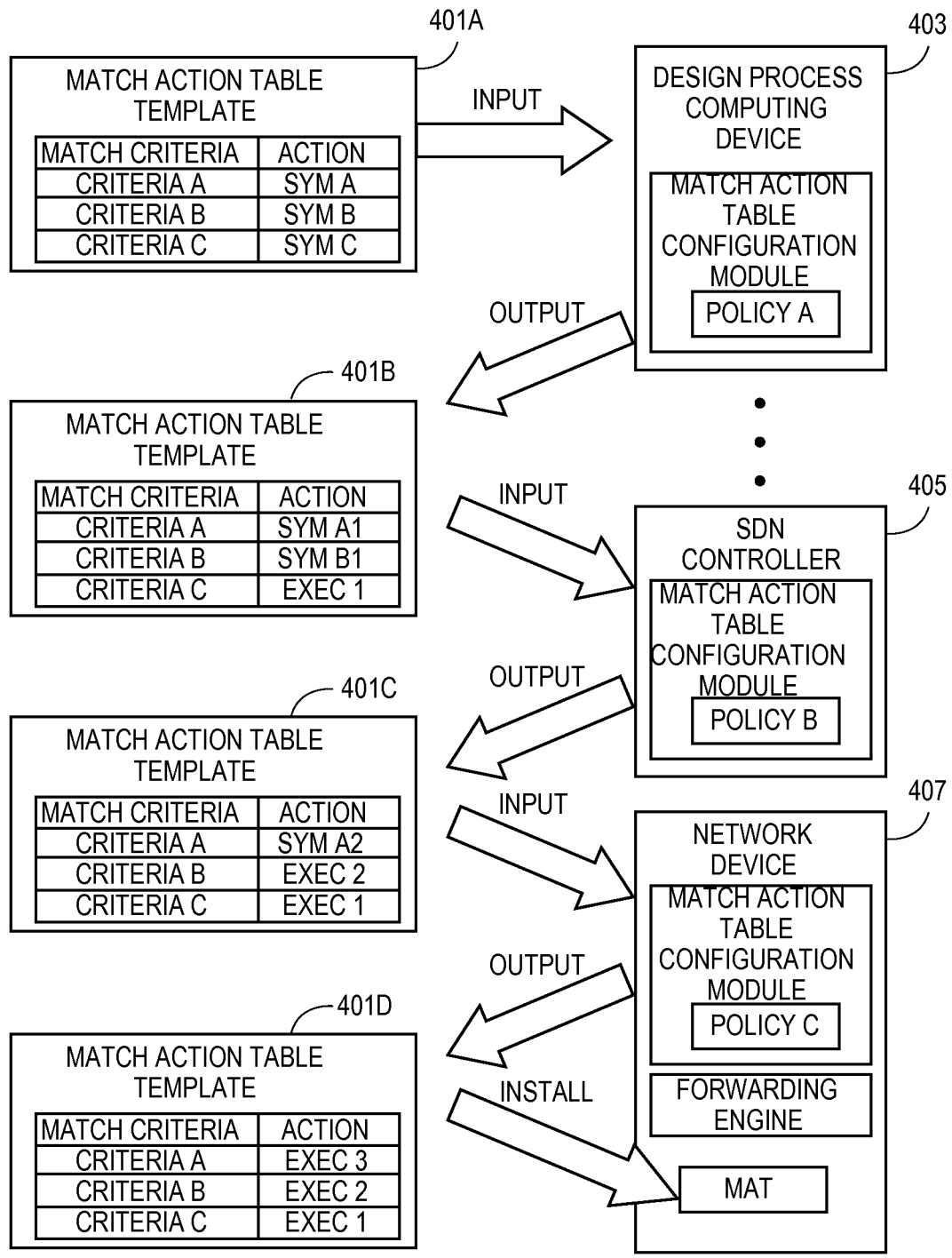
FIG. 4 is a diagram of one embodiment of an example iterative application of the process for refining match action tables from templates using policy based rules.

FIG. 4 is a diagram of one embodiment of an example iterative application of the process for refining match action tables from templates using policy based rules. This example is provided for the sake of illustration and is not provided by way of limitation. In this example scenario, the overall refinement process is carried out in a distributed manner over a set of iterations and corresponding machines that each implement one or more iterations. In this example, an initial stage is a design stage implemented at a design process computing device 403, whereas successive stages of the iterative process are carried out by an SDN controller 405 and network device 407.

The example starts with an input of a match action table template 401A. The example match action table template 401A contains a set of match action table rows with each row having a respective match criterion A-C and corresponding symbolic actions A-C. In a first iteration the match action table template is an input to the refinement process carried out by a match action table configuration module on a design process computing device 403 that applies a first policy A. The design process computing device can execute a single iteration and set of policies or any number of iterations and sets of policies; the example executes one iteration for one policy for the sake of clarity.

The result of this first iteration is a match action table template 401B, where a subset of the symbolic actions have been updated. In the example, symbolic action A and symbolic action B are updated to symbolic actions A1 and B2 respectively. In contrast, symbolic action C is updated to an executable action 1. This configuration is provided by way of example. Depending on the policies and corresponding applications, any number and extent of updates to symbolic actions can be carried out at any given iterative stage of the refinement process.

In this example, a next iterative stage of the refinement process takes place at a controller of an SDN 405, which includes a match action table configuration module and a policy B. The match action table template 401B is an input into this SDN controller 405, which further processes the match action table template 401B according to its policy B. A resulting output match action table template 401C is generated. In the example, symbolic action A1 is updated to symbolic action A2 and symbolic action B2 is updated to executable action 2.

This output match action table temple 401C is then loaded into the network device 407 to have a final iterative processing step to transform the input match action table template 401C into a match action table 401D to be utilized by the forwarding engine. The network device 407 applies a policy C to convert the remaining symbolic action A2 to executable action 3, in this example. One skilled in the art would understand that any number of iterations can be omitted at any of these devices and that other devices can be included in the refinement process. The example is provided to illustrate the distributed nature of some embodiments of the refinement process.

Figure 5:
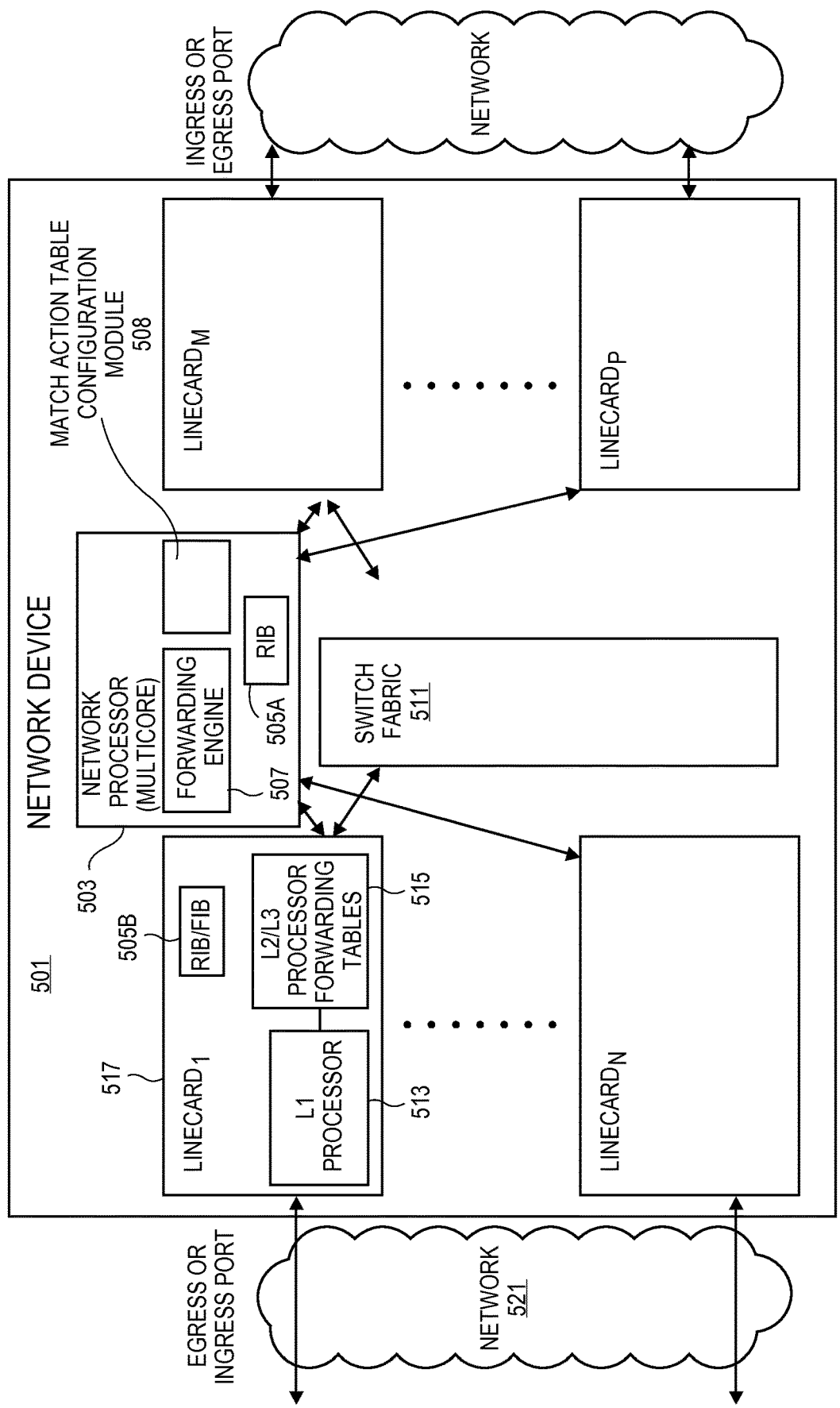
FIG. 5 is a diagram of one embodiment of a network device (ND) implementing an iterative process for generating match action tables from templates using policy based rules.

FIG. 5 is a diagram of one embodiment of a network device implementing the match action table refinement process. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a network device 501 or similar computing device. The network device 501 can have any structure that enables it to receive data traffic and forward it toward its destination. The network device 501 can include a network processor 503 or set of network processors that execute the functions of the network device 501. A 'set,' as used herein, is any positive whole number of items including one item. The network device 501 can execute a match action table configuration module 508 and a forwarding engine 507 as described herein above via a network processor 503 or other components of the network device 501. The network processor 503 can implement the forwarding engine 507 and match action table configuration module 508 as a discrete hardware, software module or any combination thereof. The network processor 503 can also service the routing information base 505A and similar functions related to data traffic forwarding and network topology maintenance. The routing information base 505A can be implemented as match action tables that are utilized for forwarding protocol data units PDUs (i.e., packets). The functions of the forwarding engine 507 and match action table configuration module 508 can be implemented as modules in any combination of software, including firmware, and hardware within the network device. The functions of the match action table configuration module 508 and forwarding engine 507 that are executed and implemented by the network device 501 include those described further herein above.

In one embodiment, the network device 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the forwarding information base 505B, or a relevant subset thereof. The forwarding information base 505B can similarly be a set of match action tables 515 that is utilized by the forwarding engine 507, which can in turn be implemented at the line card 517. The line cards 517 can also implement or facilitate the match action table configuration module 508 and forwarding engine 507 functions described herein above. The line cards 517 are in communication with one another via a switch fabric 511 and communicate with other nodes over attached networks 521 using Ethernet, fiber optic or similar communication links and media.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 501 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 6A:
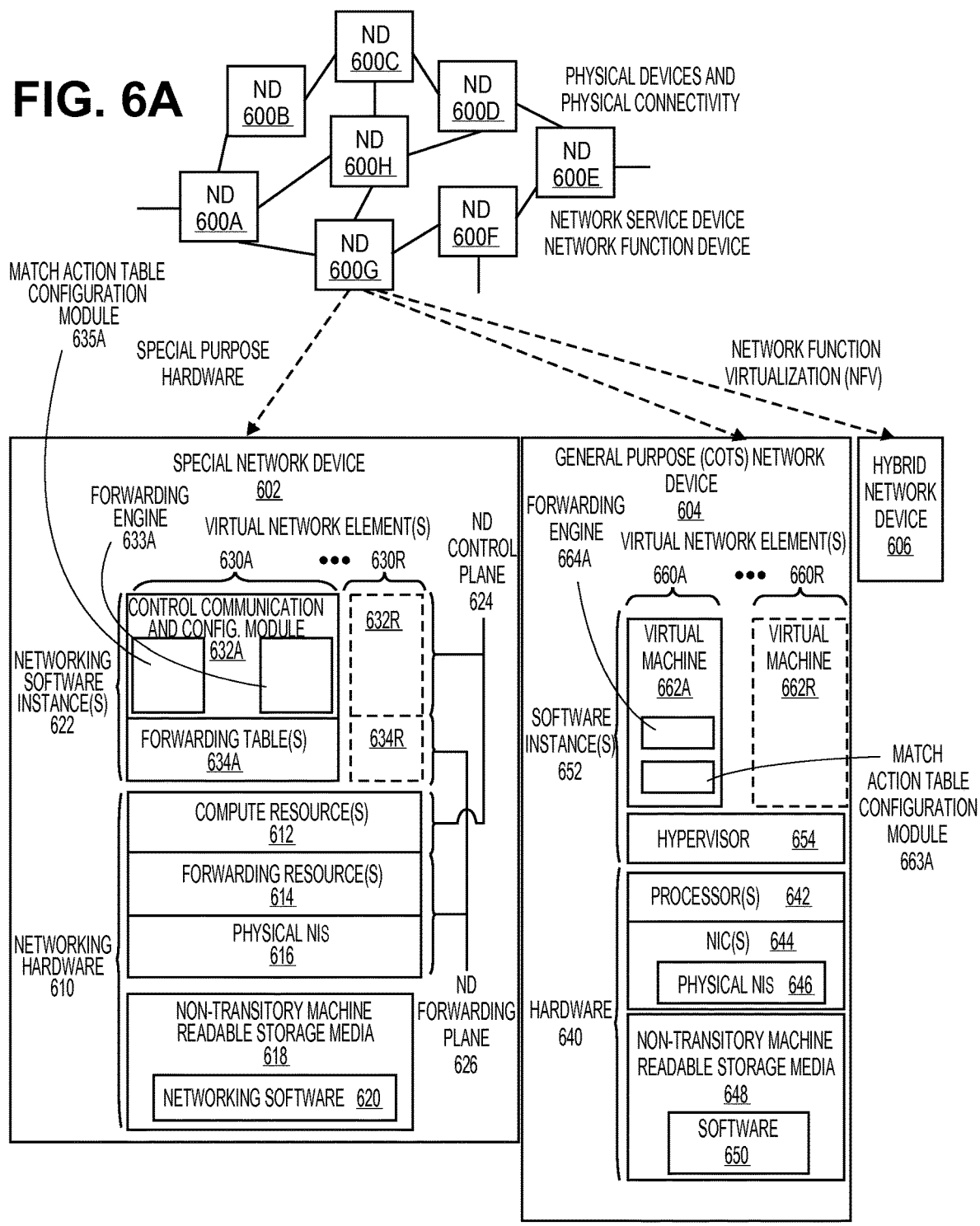
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 704 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R (i.e., implemented as match action tables), such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, the control communication and configuration module 632A encompasses the match action table configuration module 635A and forwarding engine 633A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) (i.e., implemented as match action tables) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) are to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
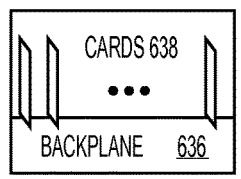
FIG. 6B illustrates an exemplary way to implement the special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In some embodiments, the virtual machine module 662A encompasses match action table configuration module 663A and forwarding engine 664A as described herein above.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R that are implementations of match action tables (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). In some embodiments, the centralized reachability and forwarding module 679 encompasses match action table configuration module functions in corresponding match action table configuration module 681 that implement match action table configuration functionality as described herein above including support for regular expressions.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 404 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
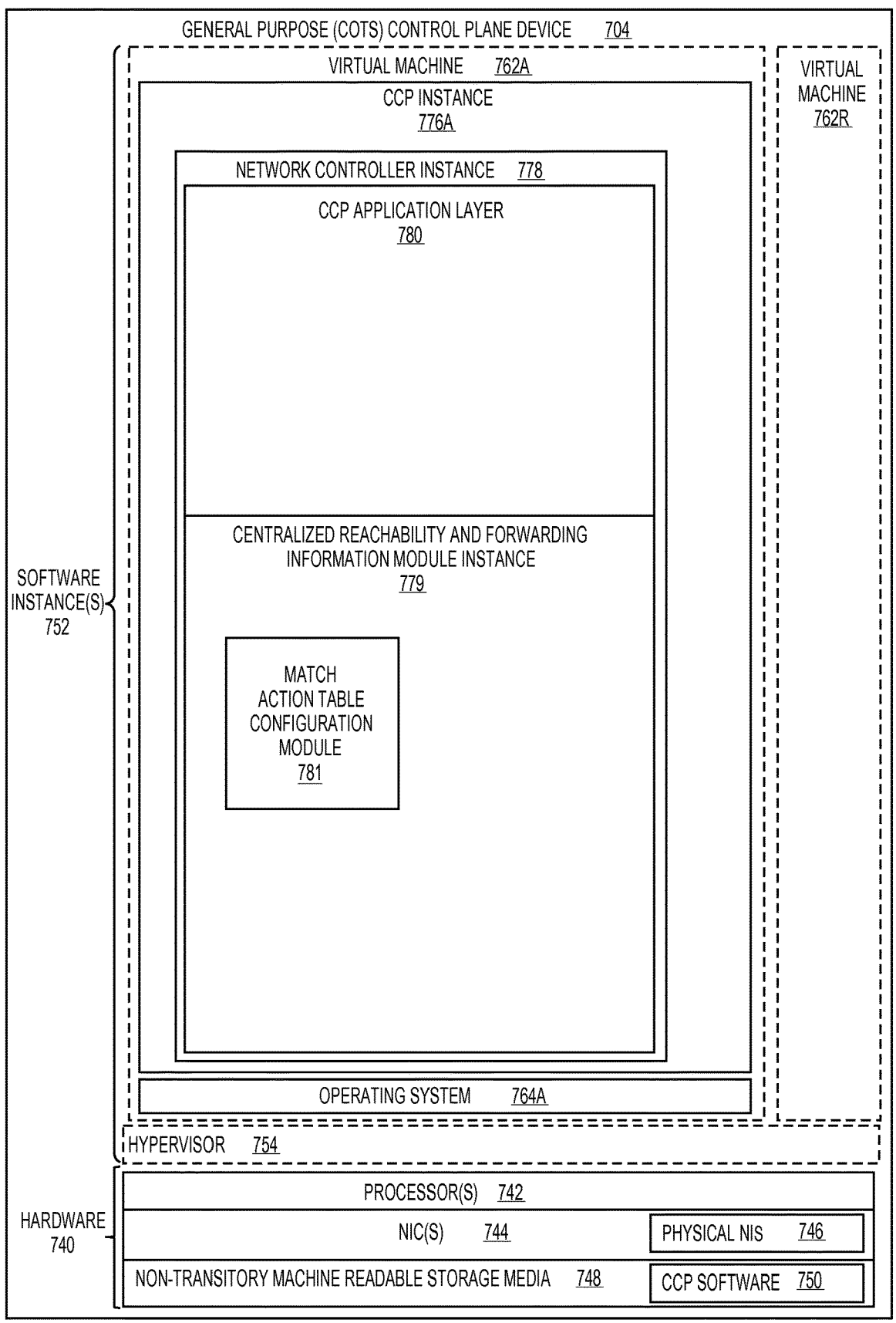
FIG. 7 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 846), as well as non-transitory machine readable storage media 848 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 864A are typically executed within the virtual machine 762A. In embodiments where compute virtualization is not used, the CCP instance 776A on top of operating system 864A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 778 to the operating system 764A and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view. The CCP application can encompass the functionality of the match action table configuration module 781 described herein above.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a processor of a networking device for generating an output match action table or output match action table template from an input match action table template, where the input match action table template and the output match action template have a same format with a match criteria field column and an action field column, the match criteria field column formatted to hold packet matching criteria and the action field column formatted to hold an executable command to act on a packet that matches a corresponding matching criteria from a same row, where the input match action table template is transformed through successive updates of symbolic actions using policy rules into the output match action table or output match action table template, the method comprising:
    selecting a first match action table row from the input match action table template;
    selecting a first action field from the first match action table row;
    checking whether the first action field includes a first symbolic action, the first symbolic action being a reference identifying an abstraction of an action to be resolved into an executable action by the network device;
    looking up the first symbolic action to determine whether a first policy rule has been defined for the first symbolic action;
    writing, by the network device, a first action into the first action field in the input match action table or a copy thereof to form the output match action table template or the output match action table to replace the first symbolic action where the first action is specified by the first policy rule; and
    processing data traffic at the network device according to a final match action table derived from the output match action table.

2. The method of claim 1, wherein the output match action table template is further iteratively processed to further update the symbolic actions by replacing the symbolic actions using a second policy rule, the method comprising:
    selecting a second match action table row from the output match action table template;
    selecting a second action field from the second match action table row;
    checking whether the second action field includes a second symbolic action;
    looking up the second symbolic action to determine whether the second policy rule in a second policy has been defined for the second symbolic action; and
    writing a second action into a corresponding action field of a corresponding match action table row in a further output match action table template or further output match action table to replace the second symbolic action where the second action is specified by the second policy rule.

3. The method of claim 1, the process further comprising the step of:
    installing the output match action table to be executed by a forwarding engine.

4. The method of claim 1, wherein the input match action table template is selected to handle traffic for a corresponding protocol.

5. The method of claim 1, wherein the first policy rule is defined for the first symbolic action to generate the output match action table template or output match action table for a corresponding application, and wherein the first policy rule is a member of a policy that is one of a set of policies forming a hierarchical tree for differentiating the output match action table template or output match action table to a set of different applications.

6. The method of claim 1, wherein the first action is a symbolic action.

7. The method of claim 1, wherein the first action is selected to be compatible with target network device type where the target network device is to process the final match action table.

8. A network device implementing a method for generating an output match action table from an input match action table template, where the input match action table template and the output match action template have a same format with a match criteria field column and an action field column, the match criteria field column formatted to hold packet matching criteria and the action field column formatted to hold an executable command to act on a packet that matches a corresponding matching criteria from a same row, where the input match action table template is transformed through successive updates of symbolic actions using policy rules into the output match action table, the network device comprising:
    a non-transitory computer-readable medium having stored therein a match action table configuration module and a forwarding engine; and
    a network processor coupled to the non-transitory computer-readable medium, the network processor configured to execute the match action table configuration module and the forwarding engine, the match action table configuration module configured to select a first match action table row from the input match action table template, to select a first action field from the first match action table row, to check whether the first action field includes a first symbolic action, the first symbolic action being a reference identifying an abstraction of an action to be resolved into an executable action by the network device to look up the first symbolic action to determine whether a first policy rule has been defined for the first symbolic action, and to write a first action into the first action field in the input match action table or a copy thereof to form the output match action table to replace the first symbolic action where the first action is specified by the first policy rule; and the forwarding engine configured to forward protocol data units based on the output match action table generated from the input match action template.

9. The network device of claim 8, wherein the match action table configuration module is configured to install the output match action table to be utilized by the forwarding engine.

10. The network device of claim 8, wherein the first action is selected to be compatible with target network device type where the target network device is to process the final match action table.

11. The network device of claim 8, wherein the first policy rule is defined for the first symbolic action to generate the output match action table for a corresponding application, and wherein the first policy rule is a member of a policy that is one of a set of policies forming a hierarchical tree for differentiating the output match action table to a set of different applications.

12. A computing device implementing a plurality of virtual machines for implementing network function virtualization (NFV), wherein a virtual machine from the plurality of virtual machines is configured to execute a method for generating an output match action table or output match action table template from an input match action table template, where the input match action table template and the output match action template have a same format with a match criteria field column and an action field column, the match criteria field column formatted to hold packet matching criteria and the action field column formatted to hold an executable command to act on a packet that matches a corresponding matching criteria from a same row, where the input match action table template is transformed through successive updates of symbolic actions using policy rules into the output match action table or output match action table template, the computing device comprising:
- a non-transitory computer-readable medium having stored therein a match action table configuration module; and
- a processor coupled to the non-transitory computer-readable medium, the processor configured to execute the virtual machine that implements the match action table configuration module, the match action table configuration module configured to select a first match action table row from the input match action table template, to select a first action field from the first match action table row, to check whether the first action field includes a first symbolic action, the first symbolic action being a reference identifying an abstraction of an action to be resolved into an executable action by the network device, to look up the first symbolic action to determine whether a first policy rule has been defined for the first symbolic action, where the first policy rule is a member of a policy that is one of a set of policies forming a hierarchical tree for differentiating the output match action table template or output match action table to a set of different applications, and to write a first action into the first action field in the input match action table or a copy thereof to form the output match action table or output match action table template to replace the first symbolic action where the first action is specified by the first policy rule, wherein a final match action table derived from the output match action table is utilized by the forwarding engine to forward protocol data units based on the output match action table generated from the input match action template.

13. The computing device of claim 12, wherein the match action table configuration module is further configured to further update the symbolic actions by replacing the symbolic actions using a second policy rule, the match action table configuration module configured to select a second match action table row from the output match action table template, to select a second action field from the second match action table row, to check whether the second action field includes a second symbolic action, to look up the second symbolic action to determine whether the second policy rule in a second policy has been defined for the second symbolic action, and to write a second action into a corresponding action field of a corresponding match action table row in a further output match action table template or further output match action table to replace the second symbolic action with the second action specified by the second policy rule.

14. The computing device of claim 12, wherein the match action table configuration module is configured to send the output match action table template to a network device implementing the data plane.

15. The computing device of claim 12, wherein the first policy rule is defined for the first symbolic action to generate the output match action table template or output match action table for a corresponding application.

16. The computing device of claim 12, wherein the first action is a symbolic action.

17. The computing device of claim 12, wherein the first action is selected to be compatible with target network device type where the target network device is to process the final match action table.

18. A control plane device configured to implement at least one centralized control plane for a software defined network (SDN), the centralized control plane configured to execute a method for generating an output match action table or output match action table template from an input match action table template, where the input match action table template and the output match action template have a same format with a match criteria field column and an action field column, the match criteria field column formatted to hold packet matching criteria and the action field column formatted to hold an executable command to act on a packet that matches a corresponding matching criteria from a same row, where the input match action table template is transformed through successive updates of symbolic actions using policy rules into the output match action table or output match action table template, the control plane device comprising:
- a non-transitory computer-readable medium having stored therein a match action table configuration module; and
- a processor coupled to the non-transitory computer-readable medium, the processor configured to execute the match action table configuration module, the match action table configuration module configured to select a first match action table row from the input match action table template, to select a first action field from the first match action table row, to check whether the first action field includes a first symbolic action, the first symbolic action being a reference identifying an abstraction of an action to be resolved into an executable action by the network device, to look up the first symbolic action to determine whether a first policy rule has been defined for the first symbolic action, where the first policy rule is a member of a policy that is one of a set of policies forming a hierarchical tree for differentiating the output match action table template or output match action table to a set of different applications, and to write a first action into the first action field in the input match action table or a copy thereof to form the output match action table or output match action table template to replace the first symbolic action where the first action is specified by the first policy rule, wherein a final match action table derived from the output match action table is utilized by the forwarding engine to forward protocol data units based on the output match action table generated from the input match action template.

19. The control plane device of claim 18, wherein the match action table configuration module is further configured to further update the symbolic actions by replacing the symbolic actions using a second policy rule, the match action table configuration module configured to select a second match action table row from the output match action table template, to select a second action field from the second match action table row, to check whether the second action field includes a second symbolic action, to look up the second symbolic action to determine whether the second policy rule in a second policy has been defined for the second symbolic action, and to write a second action into a corresponding action field of a corresponding match action table row in the output match action table template or output match action table to replace the second symbolic action with the second action specified by the second policy rule.

20. The control plane device of claim 18, wherein the match action table configuration module is configured to send the output match action table template to a network device implementing a data plane of the SDN.

21. The control plane device of claim 18, wherein the first policy rule is defined for the first symbolic action to generate the output match action table template or output match action table for a corresponding application.

22. The control plane device of claim 18, wherein the first action is a symbolic action.

23. The control plane device of claim 18, wherein the first action is selected to be compatible with target network device type where the target network device is to process the final match action table.

* * * * *